United States Patent
Filart

(10) Patent No.: US 11,172,002 B2
(45) Date of Patent: *Nov. 9, 2021

(54) SYSTEM AND METHOD FOR PREVENTING ROBOCALL VOICEMAIL DEPOSIT

(71) Applicant: T-Mobile USA, Inc., Bellevue, WA (US)

(72) Inventor: Homer Nicolas B. Filart, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/526,461

(22) Filed: Jul. 30, 2019

(65) Prior Publication Data

US 2019/0356706 A1    Nov. 21, 2019

Related U.S. Application Data

(63) Continuation of application No. 15/690,023, filed on Aug. 29, 2017, now Pat. No. 10,375,127.

(51) Int. Cl.
*H04L 29/06* (2006.01)
*H04W 8/02* (2009.01)
*H04W 8/26* (2009.01)

(52) U.S. Cl.
CPC ...... *H04L 65/1079* (2013.01); *H04L 65/1006* (2013.01); *H04L 65/1073* (2013.01);
(Continued)

(58) Field of Classification Search
CPC ..... H04L 29/06; H04L 65/10; H04L 65/1006; H04L 65/1073; H04L 65/1079;
(Continued)

(56) References Cited

U.S. PATENT DOCUMENTS

| 7,653,188 B2 | 1/2010 | Kloberdans et al. |
| 8,230,109 B2 | 7/2012 | Van Elburg et al. |

(Continued)

FOREIGN PATENT DOCUMENTS

| CN | 101247323 A | 8/2008 |
| CN | 101690074 A | 3/2010 |
| CN | 101848219 A | 9/2010 |

OTHER PUBLICATIONS

Barnes, Ed M., "An Extension to the Session Initiation Protocol (SIP) for Request History Information," Nortel, Network Working Group, RFC 4244, Nov. 2005, pp. 1-46.

(Continued)

*Primary Examiner* — Tri H Phan
(74) *Attorney, Agent, or Firm* — Lee & Hayes, P.C.

(57) ABSTRACT

Systems and methods for preventing a robocall from leaving a voicemail are described. When an incoming call without a history information header (HIH) destined for a subscriber is detected, the incoming call is prevented from leaving a voicemail if the subscriber does not answer the incoming call. If the incoming call has the HIH, additional determination process based on a visited network address of the subscriber is performed to determine whether the incoming call is to be prevented from leaving a voicemail.

16 Claims, 7 Drawing Sheets

(52) U.S. Cl.
CPC ...... *H04W 8/02* (2013.01); *H04M 2203/2027* (2013.01); *H04W 8/26* (2013.01)

(58) Field of Classification Search
CPC .......... H04W 8/02; H04W 8/26; H04M 3/42; H04M 2203/2027
See application file for complete search history.

(56) References Cited

U.S. PATENT DOCUMENTS

| | | | |
|---|---|---|---|
| 8,855,103 | B2 | 10/2014 | Allen et al. |
| 8,856,869 | B1 | 10/2014 | Brinskelle |
| 8,953,758 | B2* | 2/2015 | Kumar ............... H04M 3/54 379/88.22 |
| 9,008,298 | B2 | 4/2015 | Wright et al. |
| 9,137,380 | B2* | 9/2015 | Verbil ............... H04M 1/658 |
| 9,544,178 | B2* | 1/2017 | Van Elburg ....... H04L 29/06027 |
| 10,033,771 | B2* | 7/2018 | Allen ............... H04L 65/1069 |
| 10,110,741 | B1* | 10/2018 | Cohen ............... H04M 3/436 |
| 10,523,814 | B1* | 12/2019 | Moore ............... H04M 3/436 |
| 10,805,458 | B1* | 10/2020 | Grabowski ....... H04M 3/42059 |
| 10,819,851 | B2* | 10/2020 | Dowlatkhah ........ H04B 7/0697 |
| 10,992,803 | B2* | 4/2021 | Quilici ............. H04M 3/42059 |
| 2007/0195751 | A1 | 8/2007 | Cai et al. |
| 2009/0016242 | A1 | 1/2009 | Kakiuchi |
| 2010/0150324 | A1 | 6/2010 | Albert et al. |
| 2011/0113141 | A1* | 5/2011 | Veenstra ................. H04L 63/20 709/226 |
| 2011/0119340 | A1 | 5/2011 | Van Elburg et al. |
| 2012/0263173 | A1 | 10/2012 | Van Elburg et al. |
| 2013/0251116 | A1 | 9/2013 | Kumar |
| 2014/0341081 | A1 | 11/2014 | Efrati et al. |
| 2015/0003297 | A1 | 1/2015 | Hancock et al. |
| 2016/0330319 | A1 | 11/2016 | Farrand et al. |
| 2018/0324299 | A1* | 11/2018 | Sial ........................ H04W 4/16 |
| 2019/0068657 | A1 | 2/2019 | Filart |

OTHER PUBLICATIONS

Office Action for U.S. Appl. No. 15/690,023, dated Nov. 9, 2018, Filart, "System and Method for Preventing Robocall Voicemail Deposit," 9 pages.

PCT Search Report and Written Opinion for Application No. PCT/US2018/045605 dated Jan. 9, 2019, 10 pages.

Extended European Search Report from the European Patent Office for U.S. Appl. No. 15/690,023, dated Nov. 17, 2020, a counterpart foreign application of U.S. Appl. No. 15/690,023, 10 pages.

* cited by examiner

SYSTEM AND METHOD FOR PREVENTING ROBOCALL VOICEMAIL DEPOSIT

CROSS-REFERENCE TO RELATED APPLICATIONS

This application is a continuation of, and claims priority to, co-pending, commonly-owned U.S. patent application Ser. No. 15/690,023 filed on Aug. 29, 2017, which is incorporated herein in its entirety by reference.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

A user of such a mobile device may occasionally receive a call from an unknown caller, which may turn out be an unwanted call such as a sales, telemarketing, robocall, spam, and the like. Even if the user had subscribed to a caller ID service, seeing an unknown telephone number might not necessarily inform the user whether the call was an unwanted call. The phone number provided by the caller ID service may even be a spoofed number by a scammer. If the user is out of coverage or is outside of the user's network, for example, while roaming, and the call is rejected or unanswered, the call is directed to the user's voicemail system where the caller may leave a voicemail, which may be unwanted.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to a mechanism for preventing unwanted voice deposits, such as voicemails for robocalls.

To determine whether to allow a caller of an unanswered call to leave a voicemail, a valid incoming call for an outbound roaming subscriber needs to be distinguish from the unwanted call, such as a robocall and a spam call, for example, by evaluating presence of a history-info-header (HIH) in associated with the unanswered. The HIH captures any redirection information that may have occurred on a particular call, such as a call for an outbound roaming subscriber who is a home subscriber roaming outside of the subscriber's network. When the outbound roaming subscriber is not able to accept an incoming call (i.e., the incoming call is rejected, unanswered, or the subscriber is out of coverage), the incoming call, now an unanswered call, is forwarded to the subscriber's voicemail system, where the caller of the unanswered call may leave a voicemail for the subscriber. However, if the HIH is not present, for example, in a SIP INVITE of the unanswered call, the unanswered call is prevented from leaving a voicemail.

If the HIH is included in the SIP INVITE of the unanswered call, then the visited network address of the subscriber is evaluated next. If the visited network address of the subscriber is not a Home Global Title Address, indicating that the subscriber is roaming, but if the subscriber is actually in the home network, then the unanswered call is prevented from leaving a voicemail.

The unanswered call may additionally be subjected to a challenge, where the caller of the unanswered call is asked to reenter a sequence of randomly generated number announced by the voicemail system. If the caller fails to reenter the sequence correctly, the unanswered call is prevented from leaving a voicemail.

Figure 1:
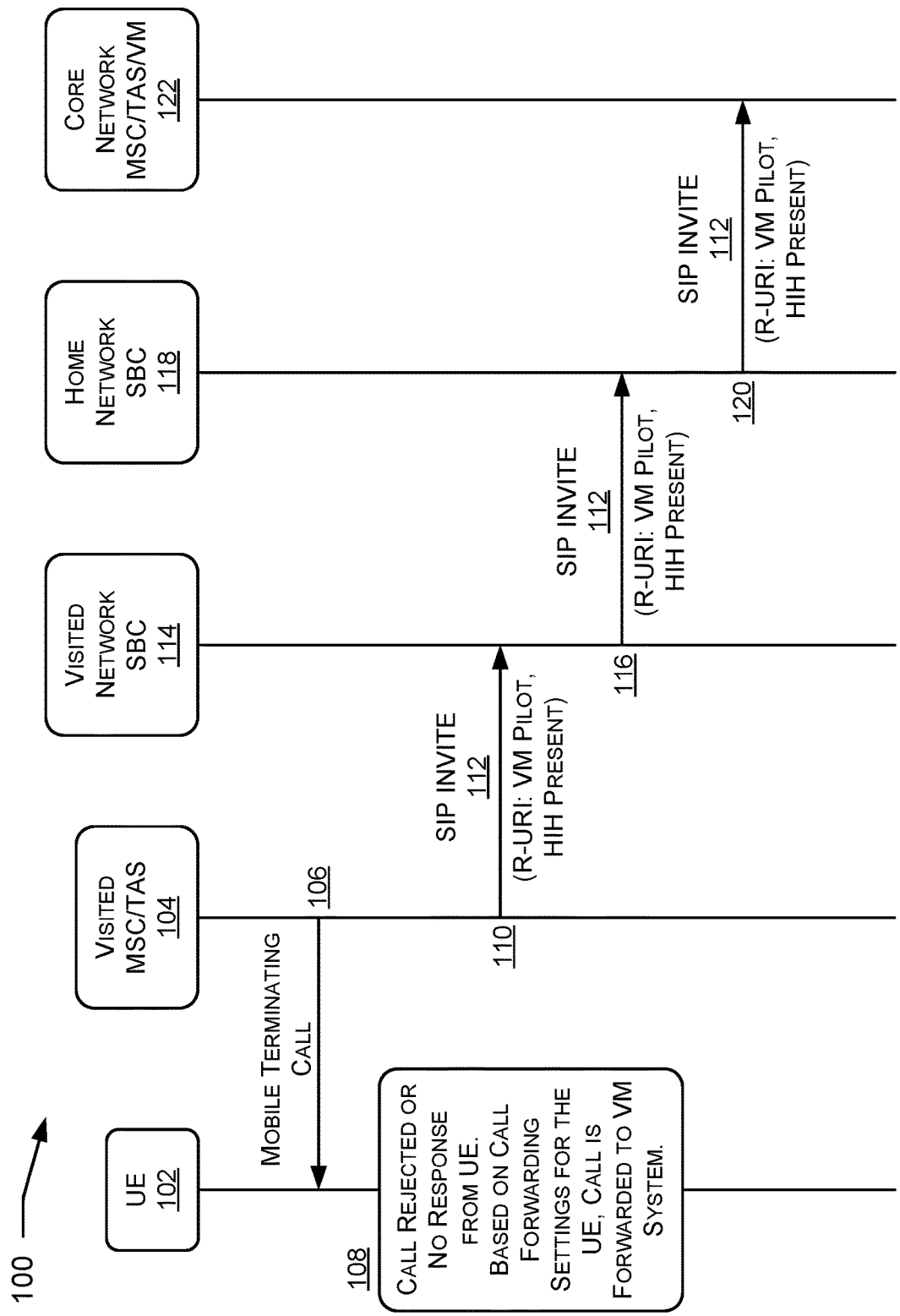
FIG. 1 illustrates an example flow diagram of a normal voicemail deposit process via call forwarding for a roaming subscriber.

FIG. 1 illustrates an example flow diagram 100 of a normal voicemail deposit process via call forwarding for a subscriber, more specifically a UE 102 of the subscriber, while roaming. A visited mobile switching center (MSC) or a telephony application server (TAS) 104, forwards a call to the UE 102 at 106. If the UE 102 rejects the call, or the call is unanswered, the unanswered call is forwarded to a voicemail system of the UE as illustrated in 108. At 110, the visited MSC/TAS 104 sends a SIP INVITE 112 having a request uniform resource identifier (R-URI), which has voicemail (VM) pilot information, such as a telephone number for the VM, and the HIH, to a visited network session boarder controller (SBC) 114. The visited network SBC 114 then forwards the SIP INVITE 112, at 116, to a home network SBC 118. The home network SBC 118 then forwards the SIP INVITE 112, at 120, to a Core Network 122, which may comprise an MSC, a telephony application server (TAS), and a voicemail (VM) system where the caller may deposit a voicemail for the subscriber. The SIP INVITE 112 messages sent at 110, 116, and 120 may not be identical to each other, however, they all include the same R-URI having the VM pilot information and the identical HIH.

Figure 2:
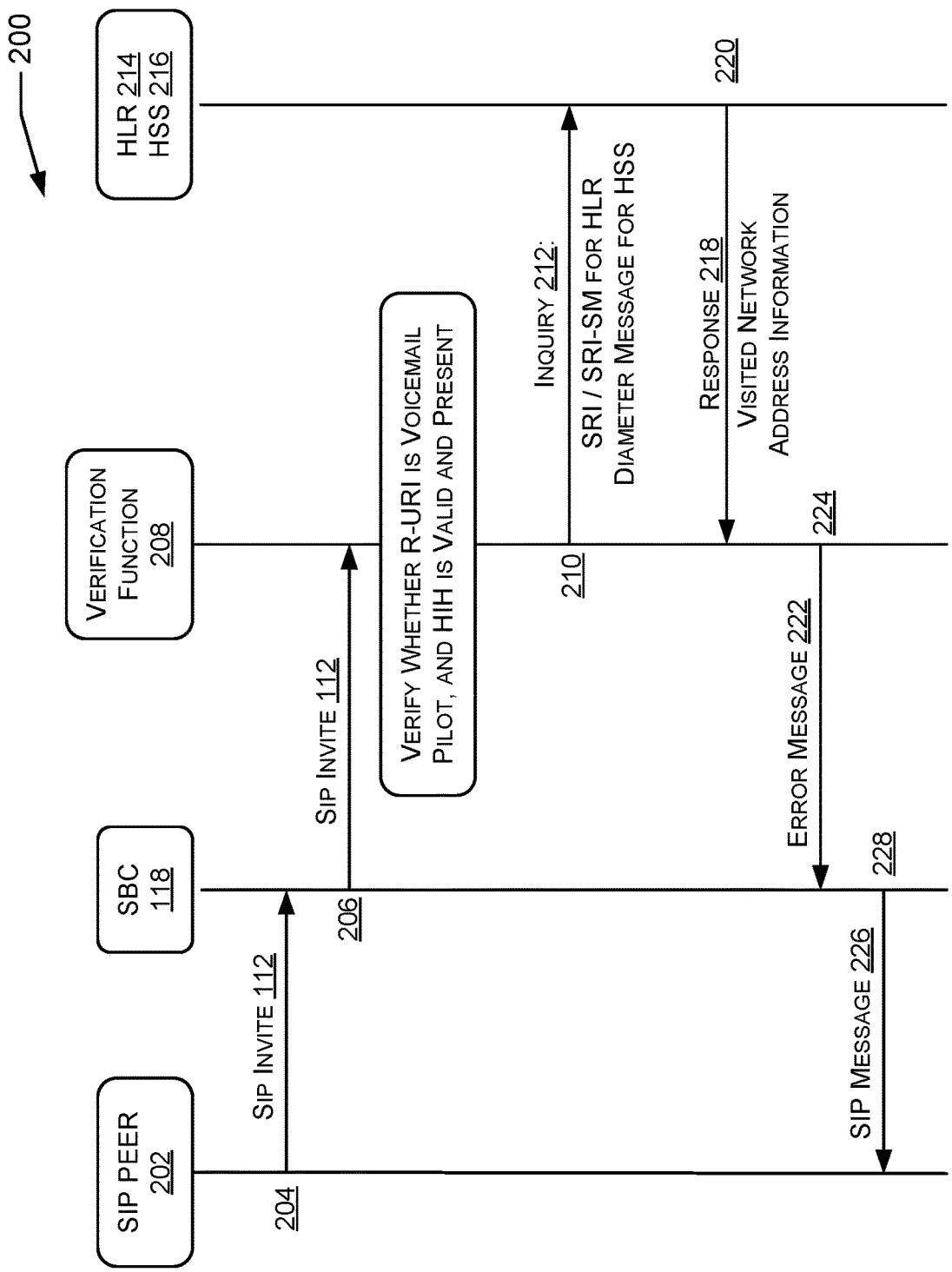
FIG. 2 illustrates an example flow diagram for preventing a robocall voicemail deposit.

FIG. 2 illustrates an example flow diagram 200 for preventing a robocall voicemail deposit. As a result of the incoming call to the UE 102 being unanswered, a SIP PEER 202, which may be an interface to the visited network SBC 114 of FIG. 1, may forward the SIP INVITE 112 to an SBC, such as the home network SBC 118 at 204. The SBC 118, at 206, may relay the SIP INVITE 112 and/or send a RESTful, or similar protocol, query to a verification function 208. In response to receiving the SIP INVITE 112, the verification function 208 may check whether the R-URI is the voicemail pilot and that the HIH is present in the SIP INVITE 112. The verification function 208 may then transmit an inquiry 212 such as a send routing information (SRI) or an SRI to short message (SRI-SM) for a home location register (HLR) 214, or a Diameter message for a home subscriber server (HSS) 216. The HLR 214/HSS 216, in response to receiving the inquiry 212 may return a response 218 including visited network address information of the UE 102 to the verification function 208 at 220. The HLR 214/HSS 216 may be, or may be a component of, a unified subscriber database (USD) (not shown).

If the R-URI is a valid voicemail pilot but the HIH is invalid or not present, then the unanswered call is presumed to be suspicious for lacking redirection information, and the verification function 208 may send to the SBC 118 an error message 222 at 224. The error message 222 may be a SIP Error code or a RESTful response to terminate the unanswered call. The SBC 118 may send to the SIP PEER 202 a SIP message 226 to terminate the unanswered call at 228. The SIP message 226 may be a SIP 486 (user busy), SIP 403 (forbidden), or any other negative SIP response to terminate the unanswered call.

Figure 3:
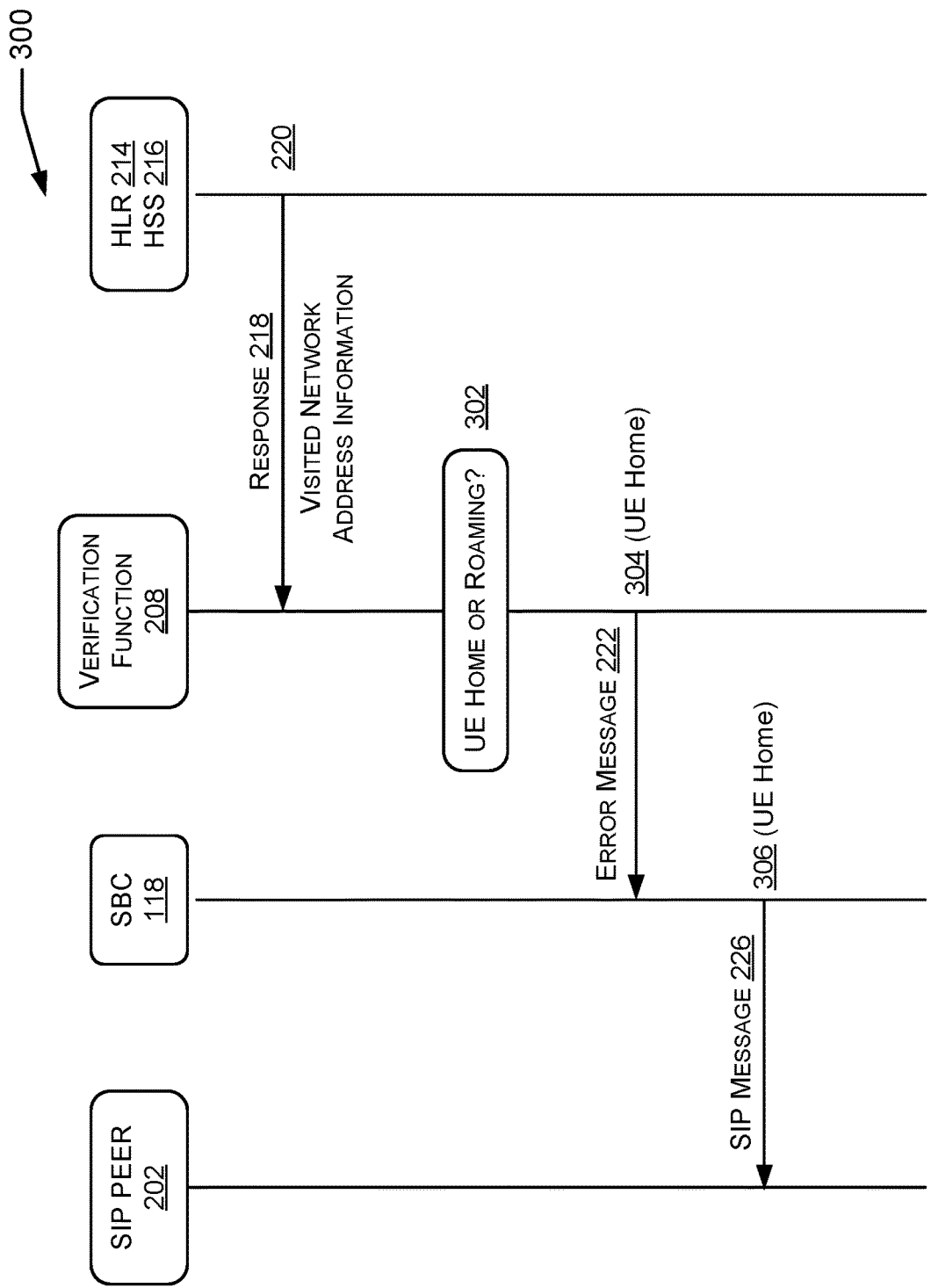
FIG. 3 illustrates an example flow diagram for preventing a robocall voicemail deposit when the HIH is present.

FIG. 3 illustrates an example flow diagram 300 for preventing a robocall voicemail deposit when the HIH is present. Continuing from FIG. 2, based on the visited network address information of UE 102 in the response 218, the verification function 208 may determine whether the UE 102 is home or roaming at 302. The verification function 208 may determine that the UE 102 is roaming if a visited network address of the UE 102 is a non-home global title address of the UE 102 in the response 218.

Upon determining that the UE 102 is in its home network, the verification function 208 may send the error message 222 at 304 to the SBC 118 to terminate the unanswered call, and the SBC 118 may send to the SIP PEER 202 the SIP message 226 to terminate the unanswered call at 306.

Figure 4:
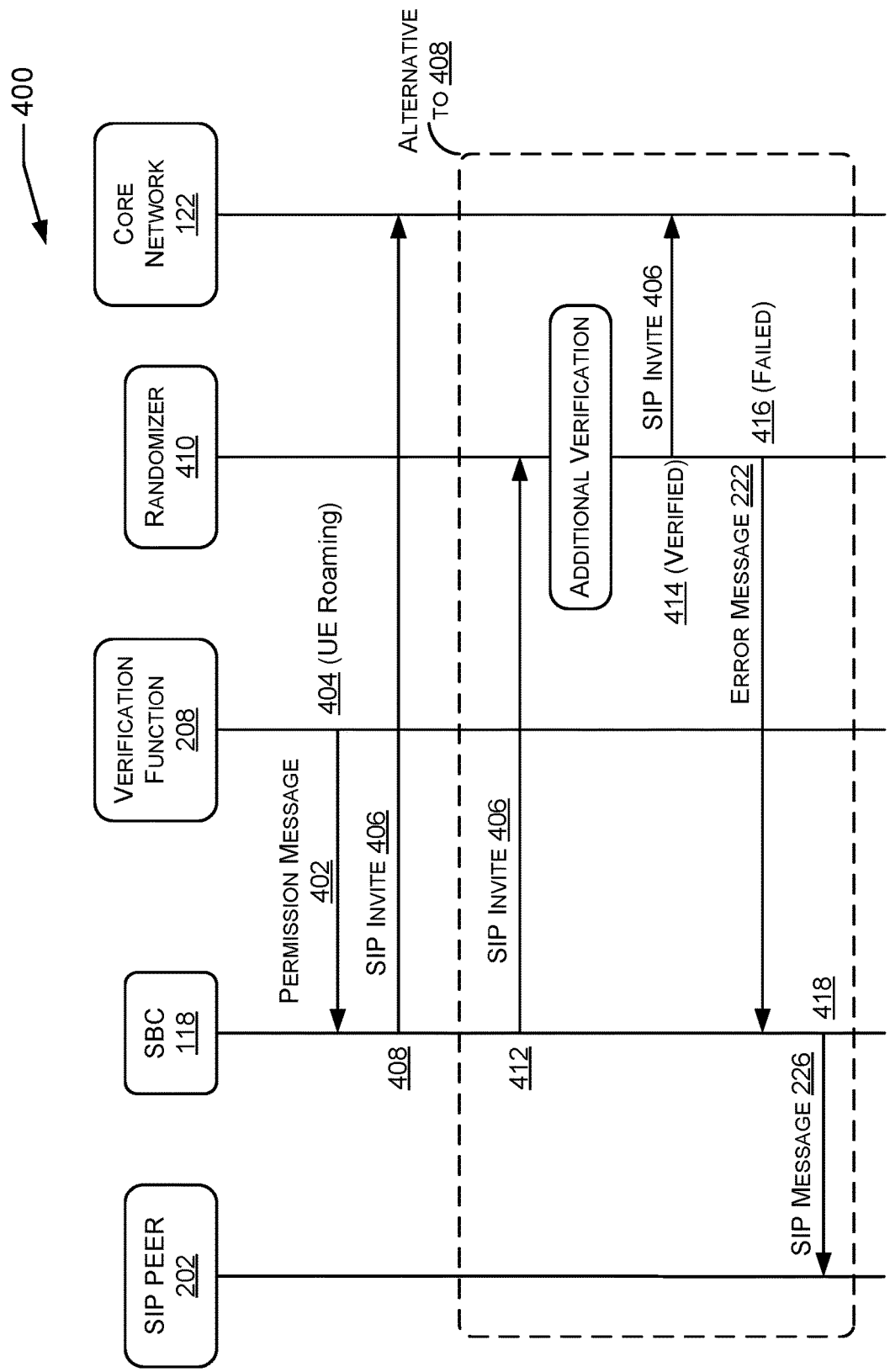
FIG. 4 illustrates an example flow diagram for preventing a robocall voicemail deposit when the UE is determined to be roaming.

FIG. 4 illustrates an example flow diagram 400 for preventing a robocall voicemail deposit when the UE 102 is determined to be roaming. Continuing from FIG. 3, upon determining that the UE 102 is roaming, the verification function 208 may send a permission message 402 at 404 to the SBC 118. The permission message 402 may be a SIP or RESTful response permitting the unanswered call to deposit a voicemail. The SBC 118 then may send a SIP INVITE 406 at 408 to the core network 122, which includes a voicemail system, where the unanswered call may be permitted to deposit a voicemail for the UE 102.

Alternatively, the unanswered call may be subjected to another verification step before being permitted to deposit a voicemail. After receiving the permission message 402, the SBC 118 may send the SIP INVITE 406 to a randomizer 410 at 412. The randomizer 410 may present a challenge to the unanswered call, or more specifically, to a caller of the unanswered call, to determine if the unanswered call is a robocall or a legitimate call. The caller may be requested to enter a sequence of numbers, which may be randomly generated and announced to the caller. If the sequence of numbers is correctly entered, then the SIP INVITE 406 is forwarded to the core network 122 at 414 where the unanswered call is allowed to deposit a voicemail for the UE 102. If the sequence of numbers were not correctly entered, then the randomizer 410 may send the error message 222 at 416 to the SBC 118 to terminate the unanswered call, and the SBC 118 may send to the SIP PEER 202 the SIP message 226 to terminate the unanswered call at 418.

Figure 5:
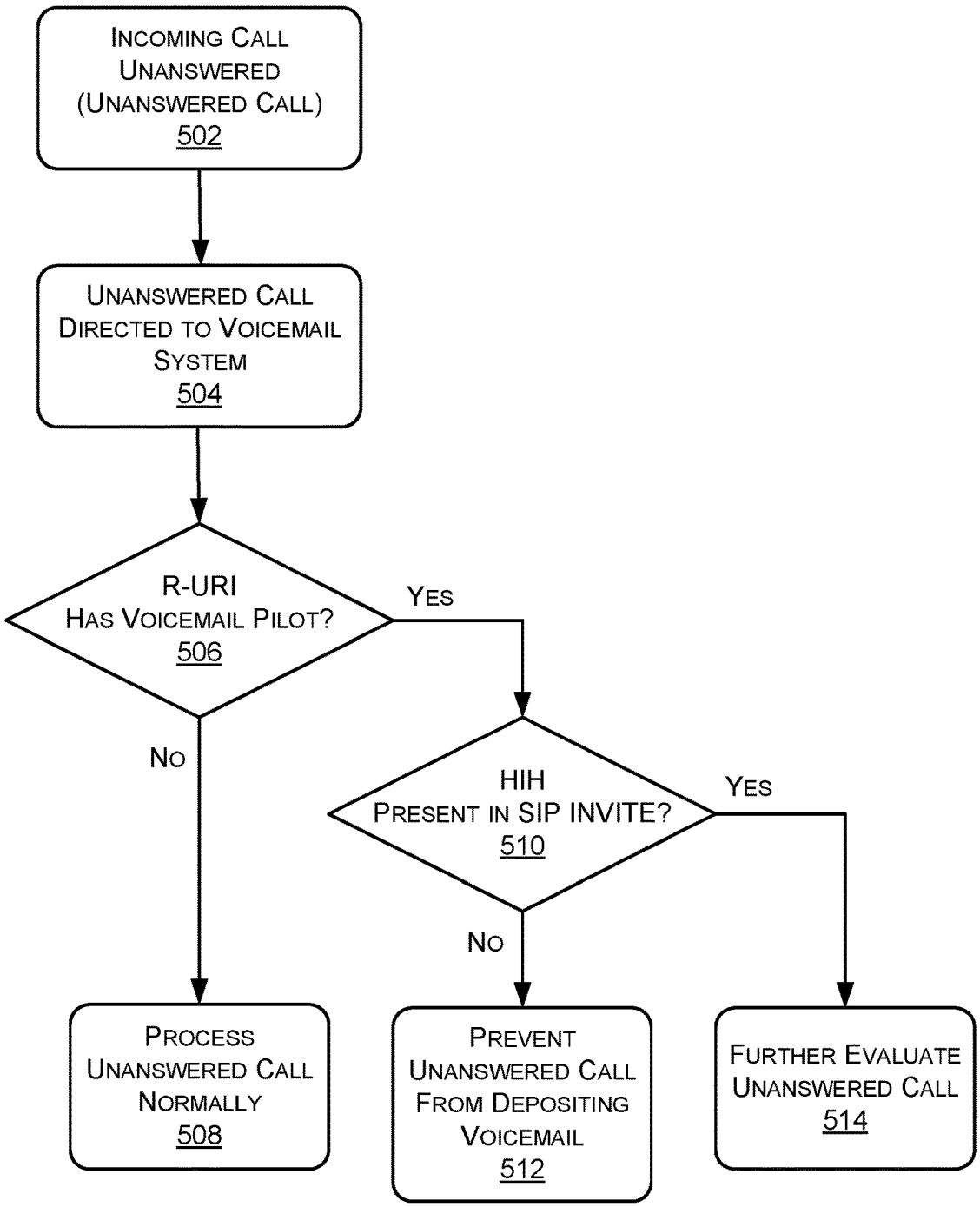
FIG. 5 illustrates an example process for preventing a robocall voicemail deposit.

FIG. 5 illustrates an example process 500 for preventing a robocall voicemail deposit.

In block 502, an incoming call targeted to a UE, such as the UE 102, is rejected or otherwise unanswered. In block 504, the unanswered incoming call, now referred as the unanswered call, may then be directed to a voicemail system, which may be a component of a core network of the UE 102, such as the core network 122. In block 506, whether the R-URI has the voicemail pilot information may be determined. If the R-URI is determined not to have the voicemail pilot information in block 506, the unanswered call is processed normally in block 508. If the R-URI is determined to have the voicemail pilot information in block 506, then whether call redirection history information is present in an attribute of the unanswered call may be determined in block 510. The call redirection history information may be an HIH as described above that includes any redirection information that may have occurred on the unanswered call, and the attribute of the unanswered call may be a SIP INVITE associated with the unanswered call initiated in an Internet Protocol (IP) multimedia subsystem (IMS). A normal forwarded call should have the HIH generated by a network node such as an MSC/MSS, if a legacy circuit-switched call, or a TAS, if an IMS call. If the HIH were determined to be invalid or not present in block 510, then the unanswered call may be prevented from depositing a voicemail in block 512. If the HIH were determined to be valid and present in block 510, then the unanswered call may be further evaluated in block 514 before being allowed to, or prevented from, depositing a voicemail.

Figure 6:
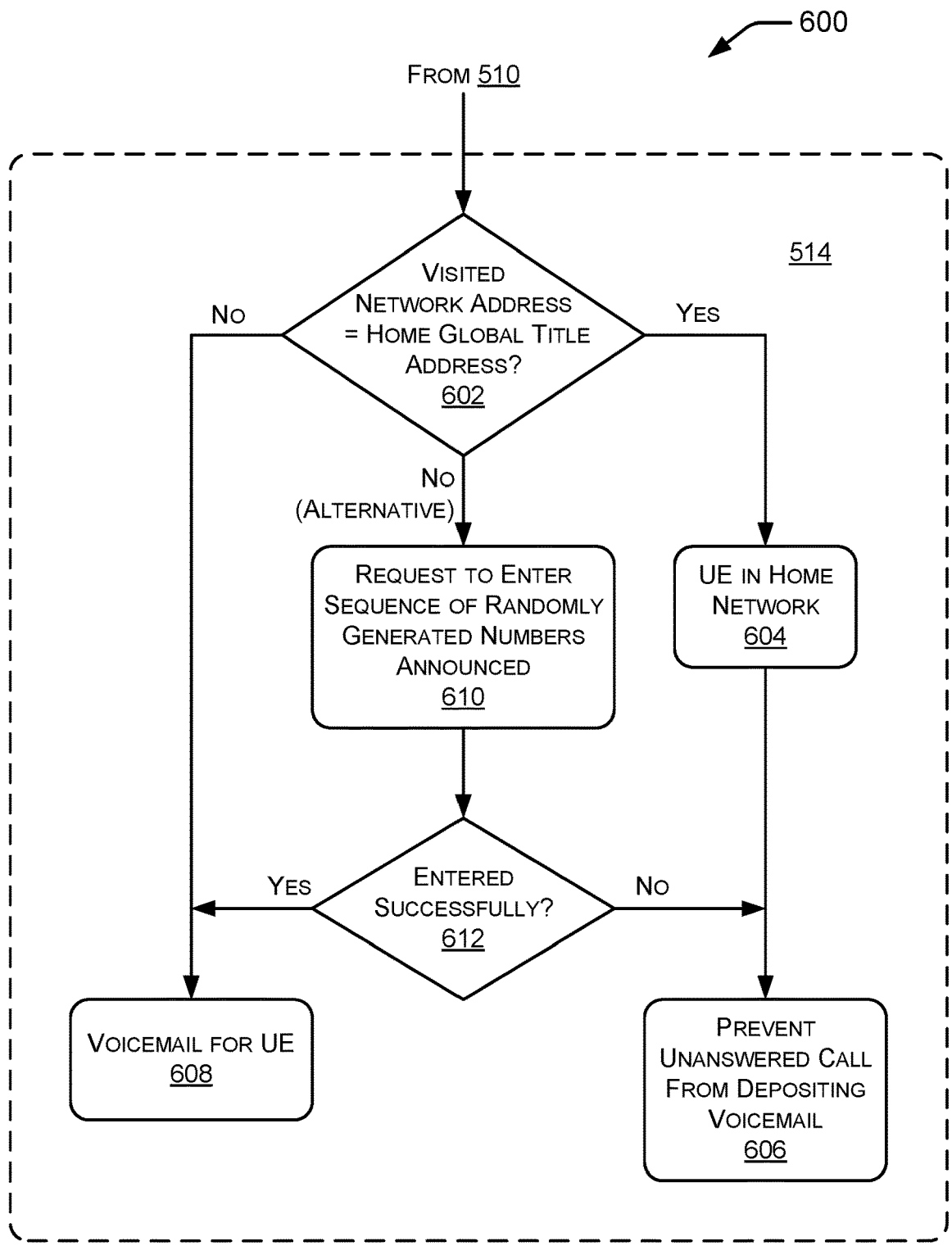
FIG. 6 illustrates an example process detailing one of the blocks of FIG. 5.

FIG. 6 illustrates an example process 600 detailing further evaluation process of block 514 of FIG. 5. In block 602, whether a visited network address of the UE 102 is a home global title address of the UE 102 may be determined. The visited network address of the UE 102 may be determined by initiating an inquiry, such as a send routing information (SRI) or an SRI for short message (SRI-SM), to one of a home location register (HLR), a home subscriber server (HSS), or a unified subscriber database (USD) of the home network of the UE 102.

If the visited network address of the UE 102 is determined to be the home global title address of the UE 102 in block 602, then the UE 102 may be presumed to be in the home network of the UE 102 in block 604, and the unanswered call may be prevented from depositing a voicemail in block 606. If the visited network address of the UE 102 is determined not to be the home global title address of the UE 102 in block 602, then the UE 102 may be presumed to be outbound roaming, i.e. not in the home network of the UE 102, and the unanswered call may be allowed to deposit a voicemail for the UE 102 in block 608.

Alternatively, the unanswered call may be subjected to a further challenge before being permitted to deposit a voicemail. In block 610, the unanswered call, specifically a caller of the unanswered call, may be requested to enter a sequence of numbers, which may be randomly generated and announced to the caller. If the sequence of numbers were correctly entered in block 612, then the unanswered call is allowed to deposit a voicemail for the UE 102 in block 608. If the sequence of numbers were not correctly entered in block 612, then the unanswered call is prevented from depositing a voicemail for the UE 102 in block 606.

Figure 7:
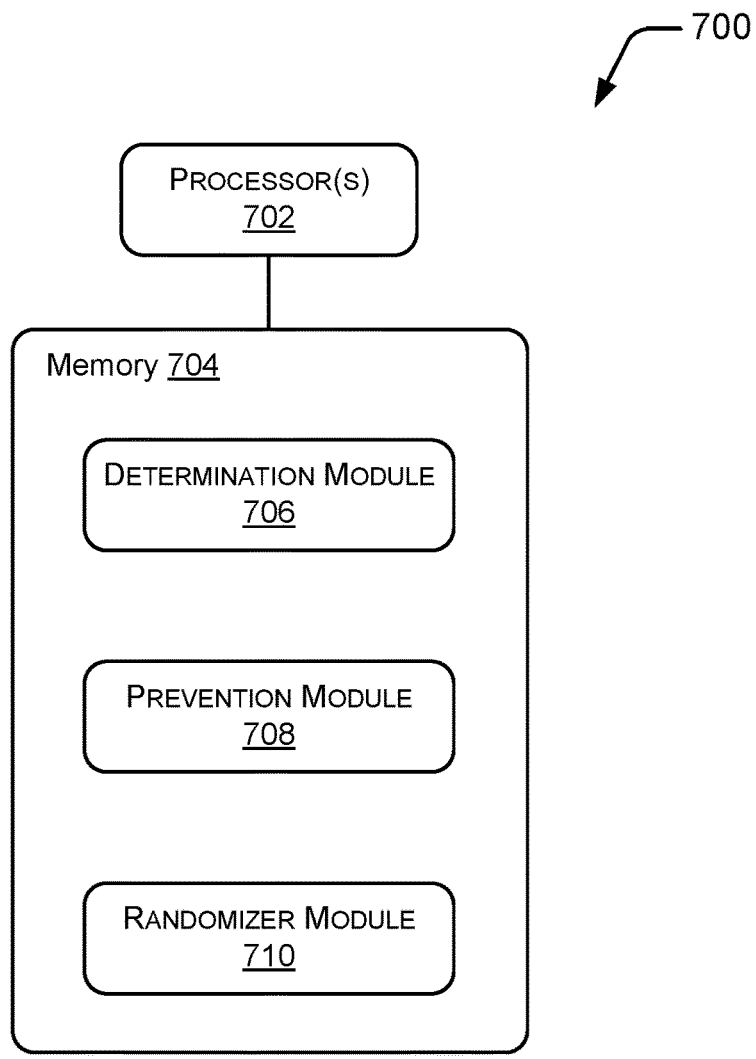
FIG. 7 illustrates an example block diagram of a system for preventing a robocall voicemail deposit.

FIG. 7 illustrates an example block diagram of a system 700 for preventing a robocall voicemail deposit.

The system 700 may comprise one or more processors 702 and memory 704 communicatively coupled to the one or more processors 702. The memory 704 may comprise a plurality of modules that are communicatively coupled to each other. The plurality of modules may comprise a determination module 706 that is configured to determine whether call redirection history information is present in an attribute of the unanswered call, and a prevention module 708 that is configured to prevent the unanswered call from depositing a voicemail if the call redirection history information is not present in the attribute. The attribute of the unanswered call may a SIP INVITE, and the call redirection history information may be a history-info header (HIH) included in the SIP INVITE. The HIH may generated by a network node in the core network 122 such as a mobile switching center (MSC), a MSC server (MSS), or a telephony application server (TAS) as discussed above with referenced to FIG. 1.

The determination module 706 may be further configured to determine whether a visitor location register visited network address of the UE 102 is a home global title address of the UE 102. If the determination module 706 determines that the UE 102 is in its home network the visited network address of the UE 102, the prevention module 708 may prevent the unanswered call from depositing a voicemail. The determination module 708 may determine the visited network address of the UE 102 is the home global title address of the subscriber by initiating an inquiry to one of a home location register (HLR), a home subscriber server (HSS), or a unified subscriber database (USD). The inquiry may include at least one of a send routing information (SRI) or an SRI for short message (SRI-SM).

The memory 704 may further comprise a randomizer module 710 configured to provide another verification step for the unanswered call. To determine if the unanswered call is a robocall or an automated call that has no human associated with it, the randomizer module 710 may announce a sequence of numbers, which may be randomly generated, to the an unanswered call, or more specifically to a caller of the unanswered call who may or may not be present. The randomizer module 710 may then request the caller to enter a sequence of numbers from the announced set of numbers. If the caller fails to enter the sequence of numbers correctly, the randomizer module 710 may prevent the unanswered call, or the caller, from depositing a voicemail.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-7. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for processing an unanswered call, the method comprising:
   receiving the unanswered call at a voicemail system associated with a user equipment (UE);
   receiving, by the voicemail system, a voicemail pilot associated with the unanswered call;
   determining, by the voicemail system, whether a call redirection history is absent from the voicemail pilot;
   upon determining that the call redirection history is absent from the voicemail pilot, preventing the unanswered call from depositing a voicemail with the voicemail system based at least in part on the voicemail pilot not including the call redirection history;
   upon determining that the call redirection history is included in the voicemail pilot:
      determining that the UE associated with the voicemail system is in a home network by:

identifying a home global title address of the UE, and
determining a visited network address associated
with the UE is the home global title address;
determining that the call redirection history contains
information indicating the UE is in a different network; and
preventing the unanswered call from depositing the
voicemail with the voicemail system.

2. The method of claim 1, wherein:
the voicemail pilot is a request uniform resource identifier (R-URI) included in a SIP INVITE of the unanswered call; and
the call redirection history is a history-info header (HIH) included in the SIP INVITE and R-URI, the HIH generated by a network node comprising at least one of a mobile switching center (MSC), a MSC server (MSS), or a telephony application server (TAS).

3. The method of claim 1, wherein determining that the call redirection history contains information indicating the UE is in the different network comprises:
identifying a visited network address from the call redirection history;
initiating an inquiry to one of:
a home location register (HLR);
a home subscriber server (HSS); or
a unified subscriber database (USD); and
determining the visited network address is not associated with the home network.

4. The method of claim 3, wherein the inquiry includes at least one of a send routing information (SRI) or an SRI for short message (SRI-SM).

5. The method of claim 1, wherein preventing the unanswered call from depositing the voicemail with the voicemail system comprises at least one of:
announcing a set of numbers to a caller of the unanswered call;
requesting the caller to enter a sequence of numbers from the set of numbers; and
determining that the caller failed to enter the sequence of numbers correctly.

6. A non-transitory computer storage medium storing computer-readable instructions executable by a computer, that when executed by the computer, cause the computer to perform operations comprising:
receiving an unanswered call, the unanswered call forwarded from a user equipment (UE);
receiving an attempt to deposit a voicemail with a voicemail system, the attempt associated with the unanswered call and the voicemail system associated with the user equipment; and
preventing the unanswered call from depositing a voicemail based on at least one of:
determining the attempt does not contain a call redirection history;
determining the attempt contains an invalid call redirection history; or
determining the attempt includes a first network address not associated with a network of the UE by:
determining the first network address is a visited network address;
determining that the visited network address is different from a home global title address associated with the UE; and
determining the network is a home network of the UE.

7. The non-transitory computer storage medium of claim 6, wherein:
the attempt is a SIP INVITE; and
the call redirection history is a history-info header (HIH) included in the SIP INVITE, the HIH generated by a network node comprising at least one of a mobile switching center (MSC), a MSC server (MSS), or a telephony application server (TAS).

8. The non-transitory computer storage medium of claim 6, wherein determining the visited network address is different from the home global title address associated with the UE comprises:
initiating an inquiry to one of:
a home location register (HLR);
a home subscriber server (HSS); and
a unified subscriber database (USD).

9. The non-transitory computer storage medium of claim 8, wherein the inquiry includes at least one of a send routing information (SRI) or an SRI for short message (SRI-SM).

10. The non-transitory computer storage medium of claim 6, wherein preventing the unanswered call from depositing a voicemail is based at least in part on:
announcing a set of numbers to a caller of the unanswered call;
requesting the caller to enter a sequence of numbers from the announced set of numbers; and
determining that the caller failed to enter the sequence of numbers correctly.

11. The non-transitory computer storage medium of claim 10, wherein the set of numbers is randomly generated.

12. A system configured to determine whether an unanswered call to a user equipment (UE) permitted to deposit a voicemail, the system comprising:
one or more processors;
memory communicatively coupled to the one or more processors, the memory comprising a plurality of modules communicatively coupled to each other, the plurality of modules comprising:
a communication module configured to receive at least a SIP INVITE and a connection attempt associated with the unanswered call;
a determination module configured to determine whether call redirection history information is present in the SIP INVITE, the call history information being a history-info header (HIH); and
a prevention module configured to prevent the unanswered call from depositing a voicemail upon determining, by the determination module, that the call redirection history information is not present,
wherein the determination module is further configured to, upon determining that the HIH is present in the SIP INVITE:
determine whether a visited network address of the UE is a home global title address of the UE, and
determining that the UE is in home network of the UE based on the visited network address of the UE, and
wherein the prevention module is further configured to prevent the unanswered call from depositing a voicemail based at least in part on a determination that the visited network address is not the home global title address.

13. The system of claim 12, wherein
the HIH is generated by a network node comprising at least one of a mobile switching center (MSC), a MSC server (MSS), or a telephony application server (TAS).

14. The system of claim 12, wherein the determination module is further configured to determine whether the visited network address of the UE is the home global title address of a subscriber associated with the UE based at least in part on an inquiry; and wherein the communication module is further configured to send the inquiry to one of a home location register (HLR), a home subscriber server (HSS), or a unified subscriber database (USD).

15. The system of claim 14, wherein the inquiry includes at least one of a send routing information (SRI) or an SRI for short message (SRI-SM).

16. The system of claim 12, wherein the plurality of modules further comprises a randomizer module, the randomizer module configured to:

announce a set of numbers to a caller of the unanswered call;

request the caller to enter a sequence of numbers from the announced set of numbers;

determine whether the caller has correctly entered the sequence of numbers; and prevent the unanswered call from depositing a voicemail upon determining that the caller failed to enter the sequence of numbers correctly.

\* \* \* \* \*